United States Patent

[11] 3,594,598

[72] Inventor Gerhard Schaub
 Nurnberg, Germany
[21] Appl. No. 863,842
[22] Filed Oct. 6, 1969
[45] Patented July 20, 1971
[73] Assignee Gebr, Buhler NACHF. GmbH
 Nurnberg, Germany
[32] Priority Oct. 23, 1968
[33] Germany
[31] G 68 03 418

[54] SPARK-SUPPRESSING COMMUTATOR
 ARRANGEMENT FOR ELECTRIC MOTOR
 8 Claims, 4 Drawing Figs.
[52] U.S. Cl. ............................................................. 310/220
[51] Int. Cl. ....................................................... H02k 13/10
[50] Field of Search ........................................... 310/220,
 221, 222

[56] References Cited
UNITED STATES PATENTS

| | | | |
|---|---|---|---|
| 2,595,024 | 4/1952 | Toulon .......................... | 310/220 |
| 3,322,988 | 5/1967 | Kazuo Ishikawa............ | 310/220 |
| 3,456,143 | 7/1969 | Saburo Uemura et al. ... | 310/220 |
| 3,487,248 | 12/1969 | Kansaku Kaneko et al. . | 310/220 |
| 3,488,538 | 1/1970 | Shigeru Hayashi........... | 310/220 |

Primary Examiner—D. F. Duggan
Attorney—Hane & Baxley

ABSTRACT: An electric motor with quenching capacitors, particularly a miniature motor of this type, has a carrier ring supporting the capacitors and seated on the rotor shaft concentric therewith. The ring is secured to soldering flags which also connect the capacitors with the commutator segments of the rotor whereby all the capacitors can be assembled as a structural unit on the rotor without causing imbalances and can also be conveniently connected to the commutator segments of the rotor.

PATENTED JUL 20 1971　　3,594,598

INVENTOR.
GERHARD SCHAUB
BY Howe and Baxley
ATTORNEYS

SPARK-SUPPRESSING COMMUTATOR ARRANGEMENT FOR ELECTRIC MOTOR

The invention relates to electric motors with quenching or interference-impeding capacitors, each of which is connected by two soldering flags to a commutator segment of the rotor of the motor, and more particularly to a miniature motor of this kind.

BACKGROUND

There are known small or miniature motors of the general kind above referred to, the quenching or interference-impeding capacitors of which are each secured between two soldering flags. Each one of the two flags serves simultaneously for connecting two capacitors and also for connecting two wire ends of the rotor windings of the motor. Due to such multiple use, the making of soldering joints during the assembly of the rotors is rather difficult, and hence time consuming. Moreover, a complex solder joint if not very carefully made, is likely to be the cause of operational breakdowns. Obviously, the costs of carefully produced and complex soldering joints are rather high. Another disadvantage of using multiple soldering joints as now known is that the capacitors supported by the rotor tend to cause an imbalance of the rotor which is particularly noticeable if the motor is operated at very high r.p.m. which is frequently the case with miniature motors.

THE INVENTION

It is a broad object of the invention to provide a novel and improved electric motor, especially a miniature motor of the general kind above referred to, the quenching capacitors of which can be rapidly and reliably mounted.

Another object of the invention is to provide a novel and improved miniature motor of the general kind above referred to, the quenching capacitors of which are so mounted that the rotor is balanced in a fully satisfactory manner.

Still another object of the invention is to provide a novel and improved miniature motor of the general kind above referred to, all the capacitors of which can be assembled on the rotor as a structural unit and also disassembled as a structural unit.

SUMMARY OF THE INVENTION

The aforepointed out objects, features and advantages, and other objects, features and advantages which will be pointed out hereinafter are obtained by mounting all the capacitors on a common annular carrier which is secured to the soldering flags. Such mounting of the capacitors on a common carrier permits assembly of the capacitors on the rotor of the motor in one operation. Moreover, combining of the capacitors in a structural unit also simplifies the soldering joints of the windings on the rotor. Mounting of the assembled carrier on the shaft of the rotor can be effected by any suitable fastening means such as soldering joints, clamps, screws, rivets, etc.

According to a particularly advantageous aspect of the invention, the capacitors are in the form of so-called barrier-layer capacitors. For this purpose, the carrier comprises a disc of semiconducting material; one side of the disc is coated with a nonconducting layer to which are adhered a plurality of spaced-apart contact areas corresponding in number to the desired number of capacitors. The contact areas are preferably produced by a suitable metal deposition. In this manner any desired number of quenching capacitors can be produced in one operation. Generally, the number of capacitors is equal to the number of commutator segments of the rotor.

The finished semiconducting disc with the contact areas thereon is mounted on the rotor coaxially therewith by simply placing the disc in abutment with the soldering flags which extend preferably substantially radially from the rotor shaft. Each of the flags is then soldered to one of the contact areas.

The contact areas are advantageously in the form of substantially equally shaped and dimensioned ring segments which are separated from each other by radial gaps. Such an arrangement provides a sufficiently large area for soldering the capacitors to the soldering flags. A change in the capacitance of the capacitors can be readily effected by correspondingly varying the width of the gaps.

To effect an accurate centering of the annular carrier thus to avoid imbalance of the rotor, an insulation collar is preferably provided on the rotor shaft interposed between the soldering flags and the commutator segments, the outer diameter of the collar matching the inner diameter of the center opening of the carrier. If the rotor shaft has already a collar, such collar can be extended sufficiently to accommodate the annular carrier.

It is also within the concept of the invention to make the soldering flags integral with the associated commutator segments and to embed the flags in an insulation body which constitutes the collar and can be slid upon the rotor shaft.

In the accompanying drawing a preferred embodiment of the invention is shown by way of illustration and not by way of limitation.

Figure 1:
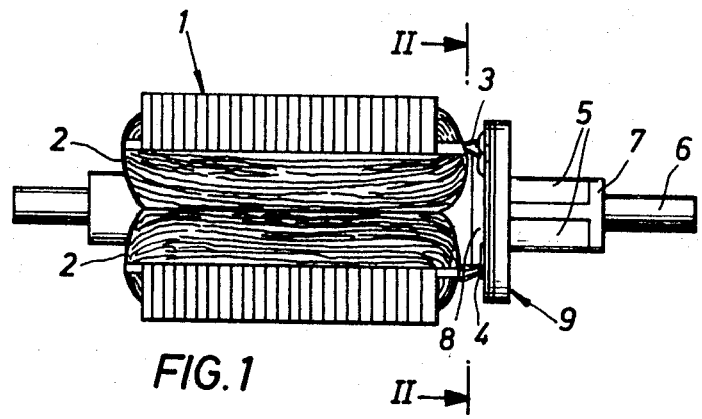
FIG. 1 is a lengthwise sectional view of the rotor of the motor.
Figures 2, 3:
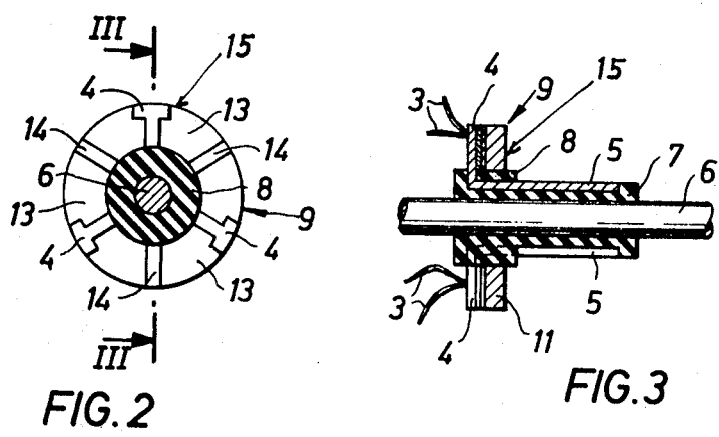
FIG. 2 is a section taken on line II–II of FIG. 1.
FIG. 3 is a section taken on line III–III of FIG. 2.

Referring now to the figures more in detail, there is shown a rotor 1 wound by way of example with three separate windings 2. Wire ends 3 of each two adjacent windings 2 are soldered to a common soldering flag 4 as it is shown in FIG. 3.

The soldering flags are each integral with a commutator segment 5 and embedded in an insulation sleeve or collar 7 slidable upon shaft 6 of the rotor. An insulation collar 8 is provided adjacent to the soldering flags on the side thereof facing commutator segments 5, thereby separating the soldering flags and the commutator segments from each other on the outside.

Figure 4:
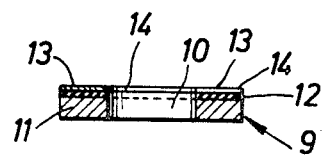
FIG. 4 is a section of the carrier with quenching capacitors mounted thereon.

Collar 8 supports an annular carrier 9 (FIG. 4) mounting number of quenching or interference-impeding capacitors 15 corresponding in number to the number of commutator segments 5, three capacitors being shown. Carrier 9 is seated upon the collar the outer diameter of which collar corresponds to the diameter of a central opening 10 in the carrier so that the carrier is accurately centered by the collar.

The quenching capacitors are formed as so-called barrier-layer capacitors. For this purpose, carrier 8 comprises a semiconducting annular disc 11 which is coated at least on the side facing flags 4 with a nonconducting $i$-layer 12. This layer mounts three approximately equally dimensioned contact areas 13 in the form of ring segments. The contact areas can be produced, for instance, by metal deposition such as sputtering, spraying or any other suitable manner of precipitation. They are made of a material capable of soldering, such as silver, gold, copper, etc., and separated from each other by radial gaps 14.

Rotor 1 as hereinbefore described is assembled by sliding insulation sleeve 7 with the soldering flags secured to the commutator segments 5 upon rotor shaft 6. Thereupon, carrier 9 is slipped upon collar 8 on insulation sleeve 7 so that the contact areas 13 abut against the associated radially disposed flags 4. If necessary, carrier 9 is turned so that, as shown in FIG. 2, each of the flags is about centered on a contact area 13. Finally, the flags 4, the contact areas 13 and wire ends 3 of the rotor windings 2 are soldered together in one operation. This soldering operation also prevents axial displacement of insulation sleeve 7 on rotor shaft 6.

It is within the scope of the invention to use quenching capacitors other than barrier-layer capacitors. Moreover, the capacitors can be formed on or mounted in any suitable way on the carrier, provided only that the carrier and the capacitors constitute a structural unit when the rotor is assembled.

Finally, the number of capacitors mounted on a common carrier can be freely selected in accordance with the rotor type and the specific requirements.

What I claim is:

1. An electric motor including a rotor with a segmented commutator, each of the commutator segments being connected to quenching capacitors, said motor comprising in combination:
   a plurality of quenching capacitors;
   a common annular carrier for said capacitors, said capacitors being secured to one side of said carrier forming a ring-shaped structural unit therewith, said unit being supported by a rotor; and
   a plurality of soldering flags electrically connected to the commutator segments and each soldered to one of the capacitors.

2. The electric motor according to claim 1 wherein said capacitors are in the form of ring segments secured to said carrier side in circumferentially spaced relationship.

3. The electric motor according to claim 2 wherein said flags terminate in soldering strips radially disposed with reference to the rotational axis of the rotor, said strips being soldered to the capacitors.

4. The electric motor according to claim 8 wherein said structural unit is supported on a shaft of the rotor coaxially therewith.

5. The electric motor according to claim 2 wherein each of said soldering flags is integral with a respective commutator segment and embedded in an insulation sleeve slidably fitted upon the rotor shaft.

6. The electric motor according to claim 1 wherein said annular carrier comprises a ring of semiconducting material, said one side of the ring being coated with a layer of electrically nonconducting material, and wherein a plurality of electrically conducting areas is adhered spaced apart to said nonconducting layer, said conducting areas in conjunction with said semiconducting ring and the nonconducting layer constituting said capacitors.

7. The electric motor according to claim 6 wherein said electrically conducting areas consist of deposited solderable metal.

8. The electric motor according to claim 6 wherein said electrically conducting areas are in the form of substantially equally sized and shaped ring segments circumferentially spaced from each other by radial gaps.